United States Patent
Petersen, III

[11] 3,757,293
[45] Sept. 4, 1973

[54] SEAT BELT CONTROL SYSTEM
[75] Inventor: Carl Mogens Petersen, III, Pontiac, Mich.
[73] Assignee: Irvin Industries, Inc., Greenwich, Conn.
[22] Filed: May 31, 1972
[21] Appl. No.: 258,262

[52] U.S. Cl. ............ 340/52 E, 340/278, 307/10 SB
[51] Int. Cl. .............................................. B60r 21/00
[58] Field of Search .......................... 340/52 E, 278; 180/82 C; 307/10 SB

[56]  References Cited
UNITED STATES PATENTS
3,449,714  6/1969  Farley, Jr. .......................... 340/52 E
3,381,268  4/1968  Boblitz .............................. 340/52 E

Primary Examiner—Alvin H. Waring
Attorney—Lloyd McAulay

[57] ABSTRACT

An electronic system employing simple Nand gate logic to require that the driver and passenger be seated prior to buckling their seat belts. The system permits a three minute delay when the vehicle stalls so that the starter mechanism will not be disabled in an emergency. The system provides various other delays so that unnecessary warning signals will not be generated during a bumpy ride or during movement of the driver on his seat when the vehicle is in operation.

43 Claims, 3 Drawing Figures

SEAT BELT CONTROL SYSTEM

This invention relates in general to a system for insuring not only that a seat belt is buckled before a car starts, but also so that it is buckled in the proper sequence, specifically after the driver and passengers sit down. More specifically, this invention is directed to providing a further safety feature so that a vehicle can be started immediately after a stall condition even if the seat belt buckling has been improper.

BACKGROUND OF THE INVENTION

The installation of seat belts has been widely required and accepted. However, many drivers and passengers do not use their seat belts.

Accordingly, it is a major purpose of this invention to provide a system which will require that the seat belts be buckled before the motor vehicle can be started.

It is known to interlock the coupling of the seat belt with a starter disabling system to require seat belt buckling before the vehicle can be started. This requirement can be defeated by maintaining the seat belts permanently buckled and/or permanently pulled out from the retractor by such techniques as knotting the webbing after pulling the webbing fully out of the retractor.

Accordingly, it is an important purpose of this invention to provide a system for assuring that the seat belt is buckled subsequent to the driver and passengers being seated in order for the motor vehicle to be started.

It is important, and thus it is an object of this invention, that this sequencing system be simple, trouble-free, difficult to defeat and of reasonable cost so that the likelihood of its installation and acceptance will be enhanced.

It is a further purpose of this invention to provide a system that will not overtly respond to the temporary movement of the driver or passenger off the seat when the vehicle is bouncing over road bumps or potholes. In particular, it is a purpose of this invention to provide this immunity to passenger bounce while at the same time requiring that driver and passengers be seated before the seat belts are buckled.

Unfortunately, even a system which requires the proper sequencing of sitting and then buckling of the seat belt can or may be compromised by certain users. It is important that in such cases where the system is subverted, that the system then not pose any additional hazards to the driver and passengers. In particular, no matter what is the condition of the seat belts, if the car stalls then it is vital that the vehicle be in a condition so that it can be immediately started again.

Accordingly, it is an important purpose of this invention to provide all of the above objects in a context where the vehicle can be started immediately after stalling regardless of the status of the seat belts.

It is of considerable importance that the system properly respond to the state of each seat belt in the vehicle. Thus, it is an important purpose of this invention that the equipment, circuitry and wires associated with each seat belt be kept to a minimum and that as much of the control functions as possible be associated with a single control unit which responds to the output from the circuits associated with each seat belt.

It is a related purpose of this invention to provide a design of sufficiently small size and simplicity so that the portion associated with each seat belt can be incorporated in the retractor framework.

It is another related purpose of this invention to provide a system for which a minimum electrical harness has to be provided in the passenger compartment area.

BRIEF DESCRIPTION OF THE INVENTION

In bief, this invention employs quad-Nand integrated circuits in order to obtain small size, low cost and low current demand, as well as high reliability. A logic design is provided in which the improper buckling of the seat belt provides a signal that energizes a starter disabling relay. A bi-stable switch arrangement associated with each seat belt is employed as the heart of a sequencing control that requires the driver and passenger to sit, thereby closing a seat switch, before buckling the seat belt. The buckling of the seat belt opens a retractor switch which if opened after the seat switch is closed, causes the retractor contained circuit to provide a signal that disables the starter disabling relay.

The control circuit includes a first timing circuit that is meaningfully operative under the condition where the car stalls and where the seat belt is not properly buckled. The heart of this timing circuit is another bi-stable switch together with a capacitor and bleed resistor that maintains a predetermined state for the switch for a predetermined time period even though the switch would otherwise have a different state. This predetermined switch state is operative to over-ride the retractor circuit starter disabling signal so that, for this predetermined time period, the starter disabling circuit is in turn disabled and the vehicle can be started.

A second capacitive timing circuit prevents undesired actuation of a warning light and buzzer system during a bumpy ride in which the occupants are thrown up enough to open the seat switch.

Figures 1, 2:
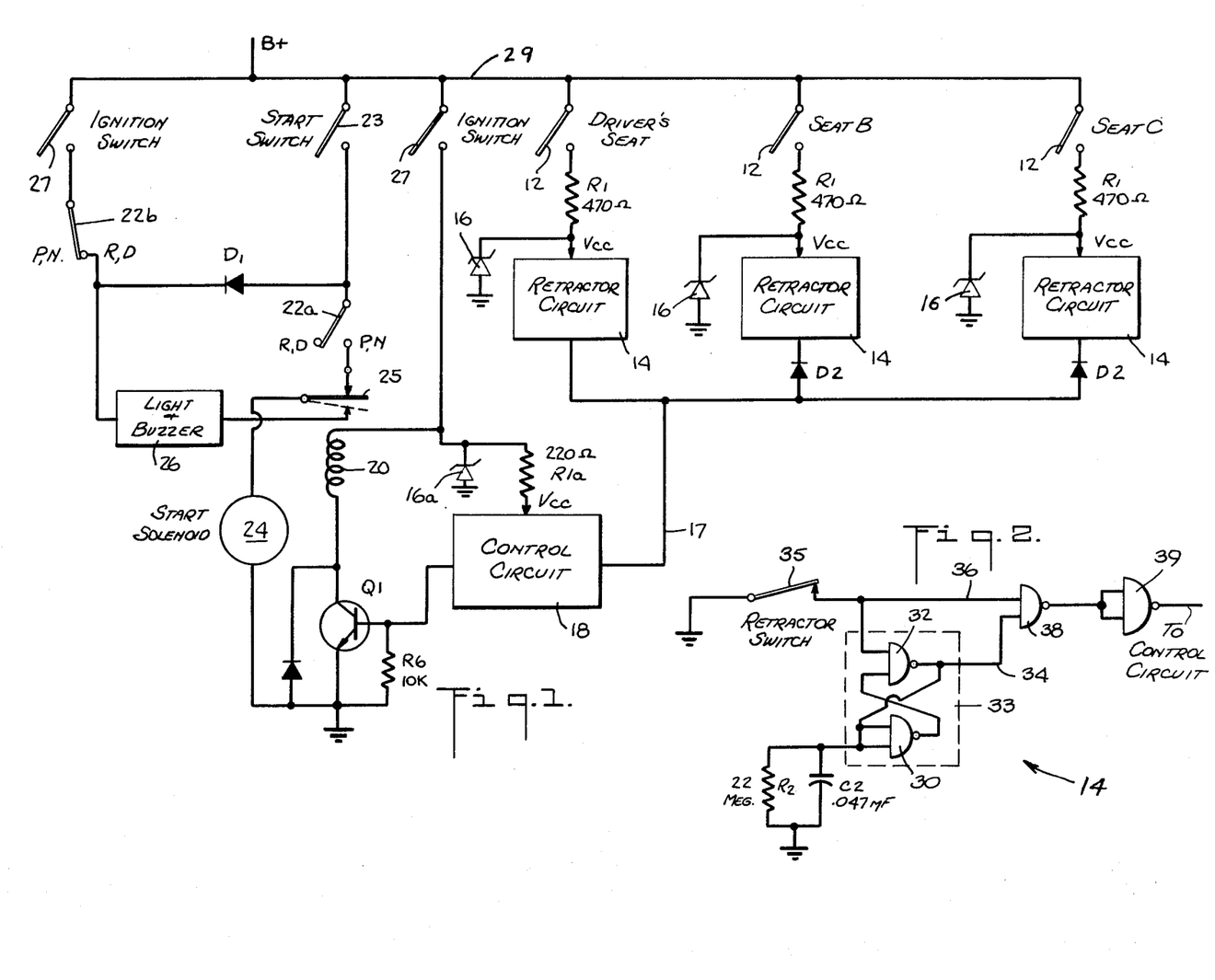
FIG. 1 is a block diagram of the system of this invention showing the inter-relationship between the various circuits associated with each seat belt and the main control circuit.
FIG. 2 is a block and schematic diagram illustrating the electrical arrangement within the retractor circuit 14 associated with each seat belt in the FIG. 1 system.

The System (FIG. 1)

FIG. 1 illustrates a system arrangement of this invention with FIGS. 2 and 3 illustrating, again in block diagram form, the arrangement of the broad units as shown in FIG. 1.

As shown in FIG. 1, battery voltage B+, normally twelve volts, is applied to normally open seat switches 12. When a driver or passenger is seated, the corresponding seat switch 12 will close and battery voltage will be applied as an input voltage $V_{cc}$ to the corresponding retractor circuit 14. Zener diodes 16 set an approximately five volt input voltage $V_{cc}$ to the retractor circuit 14. This five volts is the input voltage required for the particular four Nand gate integrated circuit that is employed as a major component of the retractor contained circuit 14. A 470 ohm resistor R1 performs a current limiting function.

Each retractor circuit 14 is identical and one such circuit 14 is shown in greater detail in FIG. 2. When battery voltage is applied to provide Vcc for one or more of the retractor circuits 14, then the output of each energized retractor circuit 14 is either a ground or a positive voltage level (3.3 volts in one embodiment). A ground level output will be considered a logical 0 for purposes of this disclosure and a positive voltage output level will be considered a logical 1 for purposes of this discussion.

In the embodiment shown, when the seat belt has been properly fastened in the proper sequence after the driver and passengers, if any, have been seated, then the output from each associated retractor circuit 14 will be a 1. If the driver or passenger has either not fastened the seat belt or has fastened the seat belt before sitting down, then the output from the associated retractor circuit 14 will be a 0. If any one retractor circuit 14 provides a ground output then the input on line 17 to the control circuit 18 will be a 0. The logic of the control circuit 18 is such that if its input (that is, line 17) is 0, then the control circuit 18 will cause the start circuit to be disabled. Only if the output from each energized retractor circuit 14 is 1, will the input on line 17 to the control circuit 18 be a 1 and only then will the start circuit disabling relay coil 20 be unenergized and thus only then will the start circuit be available to start the motor.

In operation, when the driver places his drive mode selector in park (P) or in neutral (N), the switch 22a is closed so that the closing of the start switch 23 will apply battery voltage B+ through to the start solenoid 24. The consequent energization of the start solenoid 24 will cause the motor to start. However, if the relay coil 20 is energized, the relay switch arm 25 will switch from the position shown in FIG. 1 to the dotted position which will connect the light and buzzer system 26 through the relay switch arm 25 to the starter solenoid 24. Under this condition, the closing of the start switch 23 will apply battery voltage through the diode D1 to the light and buzzer system 26 and thence through the start solenoid 24 to ground. This will cause the light and buzzer system 26 to be activated and warn the driver that the seat belt is not properly buckled. Because of the resistance of the light and buzzer system 26 the total amount of current that will flow through the start solenoid 24 under this latter condition is not enough to turn on the start motor and thus the vehicle cannot be started.

As will be described in connection with FIGS. 2 and 3, the relay coil 20 will be energized if the seat belt buckles are not properly connected. Indeed, even if while the vehicle is being driven someone disconnects the seat belt, the relay coil 20 will be energized with the result that the switch arm 25 will be switched to the dotted position shown in FIG. 1. Since the ignition switch 27 is closed at such time, battery voltage will be applied through the drive mode selector controlled switch 22b to the light and buzzer system 26 and through the switch arm 25 to the solenoid 24 and to ground. This will cause the light and buzzer system 26 to provide visual and auditory warnings that a seat belt has been unbuckled. The only way to then turn off the light and buzzer system 26 is to buckle the seat belt.

The control circuit 18 is composed of two quad-Nand integrated circuits. When the ignition switch 27 is closed, battery voltage is applied. The Zener diode 16a sets a five volt input Vcc level and the 220 ohm resistor R1a acts as a current limiter.

The logic Circuits

The Nand gates illustrated in the Figures are preferably of the type that constitute the Nand gates in a quadruple two-input positive Nand gate integrated circuit package such as the type No. N7400A. The Nand gate output is high (3.3 volts when a rated Vcc of 5 volts is employed) when either or both of the inputs is grounded. When both of the inputs are ungrounded, then the output is essentially ground (typically 0.22 volts). This is the usual logical arrangement for a Nand gate. What it is important to recognize in understanding the following description is that there does not have to be a positive voltage applied to the input terminals in order to have a logical "1" input; all that is required is that the input terminal be ungrounded in order to have a logical "1" input. Thus, with the ground input being a logical "0" and the ungrounded input being a logical "1," if both inputs are logical 1s (that is, ungrounded), then the output is a logical "0" (that is grounded). So too, if either input is a logical 0 (that is, grounded), then the output is a logical 1 (that is, has a typical 3.3 volt value). Thus it may be seen that in these Nand gates the logical 1 input differs from the logical 1 output in that the logical 1 input need only be ungrounded while the logical 1 output is a particular voltage value.

FIG. 2 illustrates in detail each of the retractor circuits 14 shown in FIG. 1. Two Nand gates 30, 32 are interconnected to provide a bi-stable switch 33 having an output at 34 and an input at 36. The Nand gate 39 is connected in a fashion, (that is, with two inputs connected together) that converts the Nand gate into an inverter.

Figure 3:
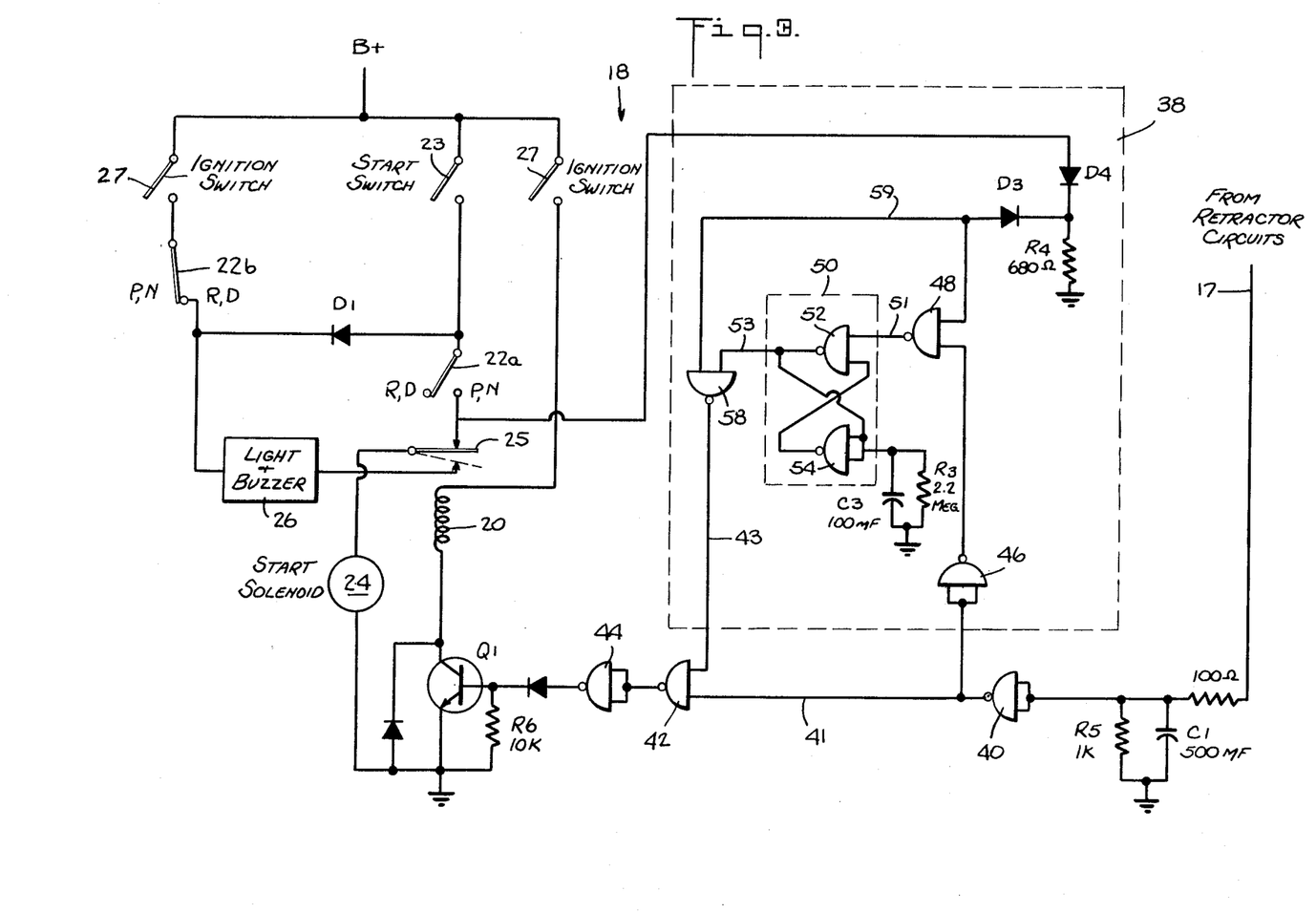
FIG. 3 is a block and schematic diagram illustrating the electrical arrangement within the control circuit 18 portion of the FIG. 1 system.

Similarly, in FIG. 3, the Nand gates 52 and 54 are interconnected to form a bi-stable switch 50 having an input at 51 and an output at 53; and the Nand gates 40, 44 and 46 are connected to function as inverters.

In each of these two switches 33 and 50, an RC network affects the operation of the switches in order to provide certain time periods for reasons indicated further on.

In FIG. 2, the RC time constant for resistor R2 and capacitor C2 is approximately one second. Thus, in a first state of the switch 33; one where the output 34 is high (a logical 1) the capacitor C2 is charged, then even though input voltage Vcc is removed, the state of the switch 33 will be unchanged providing Vcc is returned within one second.

In FIG. 3, the resistor R3 and capacitor C3 have a three minute time constant. This means that when the switch 50 output (on line 53) is 1, capacitor C3 is charged. If Vcc is removed, then the state of the switch 50 will be unchanged providing Vcc is reapplied within 3 minutes.

Because of the division between the logic circuit 14 and the logic circuit 18 and because each retractor circuit 14 is located with the associated belt in the passenger compartment of the vehicle while the control circuit 18 is located at the dashboard panel, the FIG. 1 system requires only two wires leading to or from the passenger compartment. One of the wires is the lead 17 and provides an input to the control circuit 18. The other wire is a lead that provides battery voltage to one side of each seat switch 12; this lead is represented in FIG. 1 by the line segment 29.

Retractor Circuit (FIG. 2) Normal Operation

Under normal operation, the driver sits down and thereby closes the seat switch 12, thus applying Vcc to the Nand gates. Since the seat belt has not yet been buckled and thus the retractor switch 35 is in its closed state, the input on line 36 to Nand gate 32 is 0, and thus the output on line 34 is a 1. This 1 is applied as both of the inputs to the Nand gate 30. The capaciotr C2 is charged immediately through the approximately 100 ohm output impedance of the Nand gate 32. Thus the output of the Nand gate 30 is a 0. Because the Nand gate 32 output will be a 1 as long as at least one of its inputs is a 0, this condition is a stable state for the bistable switch 33.

The two inputs to the Nand gate 38 are thus 0 (on line 36) and 1 (on line 34) resulting in a 1 output which is converted by the inverter 39 into a 0 output from the retractor circuit 14. The 0 logic output from the retractor circuit is employed as a logic input to the control circuit 18 to indicate that the seat belt is not buckled (specifically, that the webbing is wound up in the retractor).

When the driver buckles up his seat belt, his pulling the web out of the retractor will open up the retractor switch 35 thereby applying a logical 1 input on the line 36. This will not affect the output state of the Nand gate 32 or of the switch 33. However, this will apply a second 1 input to the Nand gate 38. Thus, with the inputs on the lines 34 and 36 to the Nand gate 38 both being a 1, the output from the Nand gate 38 is a 0 and the output from the inverter 39 is a 1. This 1 output from the inverter 39 is an indication that the seat belt has been properly buckled and is used as an input to the control circuit 18 to enable the start circuit.

This condition of a 1 output from the inverter 39 is maintained throughout the course of driving the car. The control circuit 18, described in detail below, requires a 1 in order to enable the start circuit.

Furthermore, if the driver or a passenger now opens his seat belt, after the vehicle has been properly started, then switch 35 closes, a 0 input on line 36 is applied to gate 38, thus providing a 1 output from gate 38 and a 0 output, on line 17, from inverter 39. The result will be, for reasons described below, the energizing of relay 20 and the consequent turning on of the light and buzzer unit 26.

As described in connection with the FIG. 3 control circuit 18, a 1 input on the line 17 is required to enable the start circuit. The diodes D2 associated with the passenger seats and not with the driver's seat assure that a driver is seated before the vehicle can start. If any retractor circuit 14 has a 0 output, the line 17 is grounded and the starter disabled. If the passenger seats are occupied and properly buckled, the associated retractor circuit 14 outputs are 1. But the diodes D2 block this output. Only if the driver is seated and his belt properly buckled will a 1 output appear on the line 17.

One of the advantages of this simple FIG. 2 retractor circuit 14 is that the circuit 14, Zener 16, resistor R1 and diode D2 can all be contained within the retractor casing. Thus, from each retractor casing there are only two lines, one line leading to the seat switch and one line leadig to line 17. Furthermore, to the front seat as a unit there are only two lines, one line 29 leading to battery voltage B+ and the line 17 to the control circuit 18. The ground connections shown in FIGS. 1, 2 and 3 are all to the same chassis ground and thus no additional leads are required to provide the ground connection.

The Bumpy Ride Problem

During a bumpy ride, the seat switches 12 may be open for a second or so. When that happens a signal is generated that could cause the light and buzzer system 26 to turn on. This undesired signal will occur when a seat switch 12 opens and also when it closes. In brief, the capacitor C1 (see FIG. 3) at the input to the control circuit 18 prevents the light and buzzer system 26 from turning on when the occupant is bounced off his seat. In brief, the RC circuit composed of the capacitor C2 and the resistor R2 prevents the light and buzzer system 26 from turning on when the occupant comes down on his seat.

In greater detail, if the occupant is bounced up, the seat switch 12 opens and "plate" voltage Vcc is removed. As a result the outputs of circuit 14, on line 17, are floating. Under this condition, the inputs to the inverter 40 (see FIG. 3) tend to be grounded through resistor R5 and thus a logical O input will tend to appear at control circuit 18 to energize the relay coil 20. But, the capacitor C1 has been charged by the 1 output on line 17 so that it will maintain a 1 input to the inverter 40 unitl it bleeds off through resistor R5. In the embodiment shown, the maintenance of the 1 input is for approximately one-half of a second.

A second problem arises when the driver comes down on the seat thereby closing the seat switch 12. As described above, this closing of the seat switch 12 after the seat belt is buckled normally porvides a ground output from the retractor circuits to thereby energize the relay coil 20 and turn on the light and buzzer system 26. As indicated above, under normal operating conditions, the line 34 is a 1. This means that the capacitor C2 is charged. When the seat switch opens, C2 stays charged, thereby tending to hold the switch 33 in its state until C2 can discharge across resistor R2. In the embodiment shown, C2 stays charged for about one second. When the seat switch 12 closes, the Nand gate 30 has both inputs as a 1, thus its output is 0 and at least one input to 32 is 0 so that the switch 33 is in the state it had prior to the seat switch opening.

If the driver gets out of the seat for more than one second, then capacitor C2 will have bled off through resistor R2 and the retractor circuit 14 will operate as described under the Normal and Non-Normal Operating Conditions described above.

It is desirable that voltage be maintained by the capacitor C2 for a larger period of time than capacitor C1 maintains voltage so that the driver will have a warning before the switch 33 changes states. The problem arises, for example, when the driver leans over to get at the glove compartment or lifts himself off the seat to get change from his pocket for a toll booth.

Under such conditions, the driver may lift or roll himself off the seat switch thereby causing the seat switch 12 to open. It would be very inconvenient for the bistable switch 33 to switch because this would require the driver to then unbuckle and rebuckle the seat belt. But, if the driver does move in a fashion that opens the seat switch 12, the capacitors C1 and C2 will function to hold the state of the circuitry for one-half second. After one-half second, the capacitor C2 will have discharged enough so that the relay coil 20 will be energized and the warning system 26 turned on. This gives the driver one-half second to settle in the seat sufficiently to close the seat switch 12 before the bi-stable switch 33 changes state. Of course, the values of the RC circuits can be selected relative to the maintenance input voltages for the Nand gates so that any desired timing relationship can be attained.

Retractor Circuit (FIG. 2) Non-Normal Operating Condition

If the driver attempts to defeat the system by having the seat belt continuously buckled, the arrangement of FIG. 2 will provide a logical 0 output, the same as if the seat belt were unbuckled, which will result in the rest of the system causing the starter solenoid to be placed in a state where it cannot be energized. The FIG. 2 system thus requires that the driver go through the sequence of first sitting on the seat and then buckling the seat belt.

If we assume that the retractor switch is open because the seat belt has been permanently buckled, then when the driver sits in the seat and closes the seat switch to apply Vcc to the Nand gates the following condition will be created. The input to the Nand gate 32, on line 36, will be ungrounded and thus a logical 1. At this point, it is uncertain as to what the output from the Nand gate 32 will be because the Nand gate bi-stable switch 33 is in an indefinite state condition. However, the capacitor C2 will for an instant cause the two inputs to the Nand gate 30 to be effectively grounded and thus provide a logically 0 at these two inputs. The result is a 1 at the output to the Nand gate 30 and thus another logical 1 input to the Nand gate 32. The two 1 inputs to the Nand gate 32 will determine the output of the Nand gate 32 to be a 0 and thus will create a stable state for the switch 33 in which the output on the line 34 is a 0. Thus one of the two inputs to the Nand gate 38 will be a 0 and the output of the Nand gate 38 will be a 1 so that the output of the inverter 40 will be a 0 indicating to the rest of the circuit a condition that it would normally indicate when the seat belt is unbuckled. In any case, the output from the inverter 40 is a logical 0 that results in disabling the starter circuit.

The capacitor C2 is required in this FIG. 2 circuit in order to assure that the input to the Nand gate 30 is a 0 in the non-normal operating condition where the seat belt is buckled before the driver sits down. The large value resistor R2 is required so that the capacitor C2 can discharge when the driver leaves the seat.

Control Circuit (FIG. 3) Normal Operation

The input to the FIG. 3 control circuit is, as shown in FIG. 1, from each of the retractor circuits 14 described in detail in connection with FIG. 2. If any one of these inputs is grounded, then the input to the FIG. 3 circuitry is ground which is treated as a logical 0. As indicated in connection with the FIG. 2 description, a 0 input to this control circuit 18 is applied under normal operating conditions after the driver and passengers have sat down and before all seat belts are buckled. This 0 input will also be applied after the driver or passengers have sat down and if any one or more of the seat belts have been buckled prior to sitting down.

The logical 0 input is converted by the inverter 40 to a 1 which is applied on the line 41 as one of the two inputs to the Nand gate 42.

The other input (on line 43) to the Nand gate 42 is also a 1 at this stage for reasons to be described immediately below. Accordingly, the output from the Nand gate 42 is a 0 which is coverted to a 1 by the inverter 44. This inverter 44 logical 1 output will mean the application of a voltage by the output of the inverter 44 to the base of the transistor Q1 thereby turning on the transistor Q1 so that the circuit to ground for the relay coil 20 is completed. Since the ignition switch 27 is closed at this point, the relay coil 20 will be energized and the switch arm 25 will move to its dotted position so that the subsequent closing of the start switch 23 will not connect battery power to the start solenoid 24. In addition, the closing of the start switch 23 will apply current through the diode D1 to the light and buzzer arrangement 26 to indicate to the driver that someone has not fastened his seat belt.

This invention will cause the relay coil 20 to be energized either (a) under the conditions where the seat belt is not buckled after a driver or passenger sits down or (b) under the condition where the seat belt is buckled prior to the driver or passenger sitting down.

The starter disabling relay coil 20 is connected to battery voltage only when the ignition switch 27 is closed. However, even though the ignition switch 27 is closed, the relay coil 20 will be energized only if the transistor Q1 is turned on which will occur only if the inverter 44 has a 1 output. This logical 1 output, as described above is represented by the fact of an approximately 3.3 volt output which is enough to turn on the transistor Q1. The inverter 44 will have a 1 output only when the Nand gate 42 has a 0 output. Thus, in order for the transistor Q1 to be turned off so that the relay coil 20 will cease to disable the start circuit, the Nand gate 42 must have a 1 output. This 1 output will occur whenever either one or both of the inputs to the Nand gate 42 is 0. Obviously, whenever the input to this control circuit 18 from the retractor circuits 14 is a 1, the output from the inverter 40 will be 0 and thus at least one of the two inputs to the Nand gate 54 will be 0 with the result that the relay coil 20 will not be energized.

The purpose of the stall circuitry 38 (including Nand gates 46, 48, 52, 54 and 58) is to provide, on line 43, a 0 input to the Nand gate 42 immediately after the vehicle has stalled even though the output from a retractor circuit 14 indicates an improper seat belt condition. The stall circuit 38 provides a three minute time period after stalling in which the vehicle can be started regardless of the seat belt situation. This stall circuit 38 is provided for safety reasons and its operation under a stall condition is described further on. However, under normal operating conditions, it is essential that the output of the stall circuit 38 (on line 43) be such that the state of the relay coil 20 is a function of the retractor circuits 14 outputs.

The state of the line 43 input to the Nand gate 42 under non-stall conditions is determined as follows. When the ignition is turned on and the line 41 is 1 (indicating an improper seat belt state), the output of the inverter 46 is 0. Thus, one of the two inputs to the Nand gate 48 is 0. The other input to the Nand gate 48 is 0 because the diode D3 grounds that input through the resistor R4. At the same time, the two inputs to the Nand gate 54 are 0 by virtue of the fact that the capacitor C3 provides an effective ground until it is charged. Thus the output of th Nand gate 54 is 1. Since both inputs to the Nand gate 52 are 1, its output is 0 and the bi-stable switch 50 has a stable state. Thus, it can be seen that both inputs to the Nand gate 58 are 0 and its output is 1 which provides the desired normal 1 input to the Nand gate 42 for the reasons described immediately above; specifically, so that the output of gate 42 will be a function of retractor circuit 14 state.

It is true that the consequent turning on of the start switch 23 will apply positive battery voltage through the closed switch 22a and diode D4 to open the diode D2 so that one of the two inputs to the Nand gate 48 will be ungrounded and thus will be a logical 1. But since the other input to gate 48 remains 0 as long as the seat belt is unbuckled, the output of the Nand gate 48 will be unchanged and the state of the rest of the stall circuit 38 will be unchanged.

Next, assuming that each seat belt including the driver's has been properly buckled, the input to the control circuit 18 will be 1 (charging the capacitor C1) and applying a 1 input to the inverter 40 to provide a 0 output which is applied to the Nand gate 42 and will thus cause the transistor Q1 to turn off thereby de-energizing the relay coil 20 and permitting the starter solenoid 24 to be energized when the start switch 23 is turned on.

This 0 or ground on the line 41 is converted to a 1 input to the Nand gate 48 by the inverter 46. When the start switch is turned on, the opening of the diode D3 provides a 1 input on the line 59 to the Nand gate 48 so that its output is a 0. Since one of the two inputs to the Nand gate 52 is now 0, its output is 1. This means that the Nand gate 52 will immediately charge the capacitor C3. The reason the capacitor C3 is immediately charged is that the Nand gate 52 has an internal resistance that is quite low; in the order of 100 ohms where the above-mentioned integrated circuit is employed. The charging of the capacitor C3 means that the two inputs to the Nand gate 54 are 1 so that its output is 0. The result is that the Nand gate 52 output is a stable 1 and the bi-stable switch 50 is in its other stable state. At this point, both inputs to the Nand gate 58 are 1 so that its output is 0 and thus the two inputs to the Nand gate 42 are 0 and Q1 is turned off.

The resistor R5 serves the important function of assuring that the start solenoid will be disabled if either (1) the wire connection between the retractor circuit (FIG. 2) and the control circuit (FIG. 3) is cut, or (2) the driver attempts to start the automobile, by reaching through the window without first sitting on the seat. Under either of these conditions, the logic input to the FIG. 3 control circuit, although not grounded, will not provide current and voltage to the capacitor C1. In effect, in either case, the logic input will be a "float." This results in both inputs to the Nand gate 40 being grounded through the resistor R5. This 0 input condition results in energizing the relay coil 20 as described above and thus disabling the starter circuit.

Stall Operation (FIG. 3)

If the vehicle is operated without the seat belt properly buckled, which might occur if the driver or owner has disabled the light and buzzer system 26 so that after buckling the seat belt the seat belt can be opened and the vehicle driven, it is important that the starter disabling mechanism not be actuated when the vehicle stalls. The stall condition may occur in a situation of some danger to the occupants which requires that the engine be started up immediately. For example, this condition might occur where an automobile is stalled on a railroad track.

Assume that the vehicle stalls, and that the seat belts are unbuckled so that the input to the control circuit 18 is ground. It is important that for a short period of time the driver be able to start the car immediately for reasons of safety. Because one or more seat belts are unbuckled, the 0 input to the control circuit 18 will mean a logical 1 on the line 41 and thus there will be no guarantee that the output from the Nand gate 42 will be the required 1 unless the other input, on the line 43, to the Nand gate 42 is 0. As indicated above, prior to stalling the Nand gate 58 output on line 43 is 1. The other input, on line 41, to gate 42 is 1. Thus the relay coil 20 is energized. When the ignition is turned on after stalling, the condition is the same as before stalling and will remain as such for three minutes because of the operation of the capacitor C3.

Whenever the ignition is turned off, it will take about three minutes for the one hundred microfarad capacitor C3 to bleed off across the 2.2 megohm resistor R3. During that 3 minute period the two inputs to the Nand gate 54 will be maintained 1 so that its output will be 0. Thus, one of the two inputs to the Nand gate 52 is 0 and its output will remain 1 so that one of the two inputs to the Nand gate 58 will remain 1. The other input to the Nand gate 58 will be 0 because of the grounding of line 59 through D3 and R4. This means a 1 output from gate 58. Thus with two 1s into gate 42, the coil 20 is energized and the starter system disabled. But what is desired is to start the car for a short period after stall. The system provides this result because the turning on of the start switch 23 applies battery B+ through the closed switch 22a and diode D4 to open the diode D2 and thus apply a 1 input on line 59 to gate 58. Because gate 54 is held in its state for 3 minutes by capacitor C1, the other input (from gate 52) to 58 remains 1. Thus, the Nand gate 58 output is 0, the Nand gate 42 output is 1, the inverter 44 output is 0, Q1 is off and the relay coil 20 is de-energized when the start switch 23 is closed.

For a 3 minute period after ignition is turned off the bi-stable switch 50 cannot switch and the vehicle can be started even though the seat belt buckling is improper.

However, if the ignition is turned off when a driver normally leaves the car, the capacitor C3 will bleed off across the resistor R3 in about three minutes. Then if the driver returns to the car and attempts to turn on the start motor without properly buckling the seat belt, the condition described above in connection with the normal operation of this circuit will occur in which the Nand gate 54 inputs are initially grounded and in which both inputs to the Nand gate 52 are 1 so that its output is 0 and the output of the Nand gate 58 is 1.

Thus it can be seen that the reason why the ignition switch 27 is used to provide Vcc to the control circuit 18 is that it is when the ignition switch 27 is turned off, that the 3 minute timing period is to start functioning even if the seat belt is not buckled.

Although this invention has been described in connection with one specific embodiment, it is obvious that certain changes can be made without departing from the scope of the invention.

For example, the inverter 46 could be omitted if the related input to the Nand gate 48 were coupled to the input side of the inverter 40 rather than to the output side of the inverter 40. However, since two quad-Nand gate ICs are employed in connection with FIG. 3, the Nand gate 46 is included so that a floating Nand gate in the IC is avoided.

The retractor switch 35 is incorporated within the retractor unit in order to provide minimum wiring. However, the switch 35 could be coupled through the seat belt buckle so that its state is a function of the actual coupling of the two portions of the buckle. Thus the retractor switch 35 is in fact a seat belt state responsive switch.

Furthermore, the timing of the various IC networks, specifically: C2 and R2; C1 and R5; and C3 and R3 can be varied to provide whatever timing is desired for the bumpy ride condition and for the stall condition.

What is claimed is:

1. In a safety seat belt system having an ignition switch and a starter disabling mechanism, the improvement comprising:
    a seat belt state responsive switch having a first state when the seat belt is buckled and a second state when the seat belt is fully taken up in its retractor,
    a seat switch having a first state when an occupant is seated and a second state when the associated seat is empty,
    first logic curcuit means energized by the first state of said seat switch and responsive to the state of said seat belt actuated switch,
    said first logic circuit having a first state output in response to (a) the combination of said second state of said seat belt state responsive switch and said first state of said seat switch or (b) the switching of said seat switch from its second state to its first state while said seat belt state responsive switch is in its first state,
    said first logic circuit having a second state output in response to the switching of said seat belt responsive switch from its second state to its first state while said seat switch is in its first state, and
    second logic circuit means energized by the closing of the ignition switch and responsive to said states of said first logic circuit to provide a starter enable state in response to said second state output of said first logic circuit and to provide a starter disable state in response to said first state output of said first logic circuit; said starter enable state turning off the starter disabling mechanism and said starter disable state turning on the starter disabling mechanism.

2. The system of claim 1 wherein:
    said first and second logic circuits are separated, said first logic circuit being located within the passenger compartment of the vehicle and said second logic circuit being located outside of the passenger compartment,
    and further comprising:
    no more than two wires leading to or from the passenger compartment, one of said wires providing energizing current and the other of said wires providing the output from said first logic circuit to said second logic circuit.

3. The system of claim 1 wherein:
    said first logic circuit is energized solely by said first state of said seat switch, and said second logic circuit is energized solely by the closing of the ignition switch,
    so that no current flows in said system when the ignition switch is opened while the associated seat is unoccupied.

4. The system of claim 2 wherein:
    said first logic circuit is energized solely by said first state of said seat switch, and said second logic circuit is energized solely by the closing of the ignition switch,
    so that no current flows in said system when the ignition switch is opened while the associated seat is unoccupied.

5. The system of claim 1 further comprising:
    a plurality of sets of said seat belt state responsive switches, said seat switches and said first logic circuit means,
    each of said sets associated with a separate seat position,
    each of said sets being in electric parallel and having a common output,
    said common output being coupled to said second logic circuit means.

6. The system of claim 2 further comprising:
    a plurality of sets of said seat belt state responsive switches, said seat switches and said first logic circuit means,
    each of said sets associated with a separate seat position,
    each of said sets being in electric parallel and having a common output,
    said common output being coupled to said second logic circuit means.

7. The system of claim 3 further comprising:
    a plurality of sets of said seat belt state responsive switches, said seat switches and said first logic circuit means,
    each of said sets associated with a separate seat position,
    each of said sets being in electric parallel and having a common output,
    said common output being coupled to said second logic circuit means.

8. The system of claim 4 further comprising:
    a plurality of sets of said seat belt state responsive switches, said seat switches and said first logic circuit means,
    each of said sets associated with a separate seat position,
    each of said sets being in electric parallel and having a common output,
    said common output being coupled to said second logic circuit means.

9. The system of claim 5 further comprising:
    means to uncouple said second state output of those ones of said first logic circuits in those of said sets that are associated with the non-driver passenger seats from said second logic circuit, said second logic circuit thereby responsive to said second state output of only the driver seat associated one of said first logic circuits.

10. The system of claim 6 further comprising:
    means to uncouple said second state output of those ones of said first logic circuits in those of said sets that are associated with the non-driver passenger seats from said second logic circuit, said second logic circuit thereby responsive to said second state output of only the driver seat associated one of said first logic circuits.

11. The system of claim 8 further comprising:
    means to uncouple said second state output of those ones of said first logic circuits in those of said sets that are associated with the non-driver passenger seats from said second logic circuit, said second logic circuit thereby responsive to said second state output of only the driver seat associated one of said first logic circuits.

12. The system of claim 1 further comprising:
first delay means coupled to said second logic circuit to hold said second logic circuit in said enable state for a first predetermined time period after the ignition switch turns off.

13. The system of claim 2 further comprising:
first delay means coupled to said second logic circuit to hold said second logic circuit in said enable state for a first predetermined time period after the ignition switch turns off.

14. The system of claim 3 further comprising:
first delay means coupled to said second logic circuit to hold said second logic circuit in said enable state for a first predetermined time period after the ignition switch turns off.

15. The system of claim 5 further comprising:
first delay means coupled to said second logic circuit to hold said second logic circuit in said enable state for a first predetermined time period after the ignition switch turns off.

16. The system of claim 11 further comprising:
first delay means coupled to said second logic circuit to hold said second logic circuit in said enable state for a first predetermined time period after the ignition switch turns off.

17. The system of claim 1 further comprising:
said first logic circuit having a third state output in response to said second state of said seat switch, and
second delay means coupled between said first logic circuit and said second logic circuit to maintain an input to said second logic circuit simulating said second state output of said first logic circuit for a second predetermined time period after said first logic circuit switches from its second state output to its third state output and to provide an input to said second logic circuit simulating said first state output of said first logic circuit after said second predetermined time period when said second logic circuit has its third state output.

18. The system of claim 2 further comprising:
said first logic circuit having a third state output in response to said second state of said seat switch, and
second delay means coupled between said first logic circuit and said second logic circuit to maintain an input to said second logic circuit simulating said second state output of said first logic circuit for a second predetermined time period after said first logic circuit switches from its second state output to its third state output and to provide an input to said second logic circuit simulating said first state output of said first logic circuit after said second predetermined time period when said second logic circuit has its third state output.

19. The system of claim 3 further comprising:
said first logic circuit having a third state output in response to said second state of said seat switch, and
second delay means coupled between said first logic circuit and said second logic circuit to maintain an input to said second logic circuit simulating said second state output of said first logic circuit for a second predetermined time period after said first logic circuit switches from its second state output to its third state output and to provide an input to said second logic circuit simulating said first state output of said first logic circuit after said second predetermined time period when said second logic circuit has its third state output.

20. The system of claim 2 further comprising:
said first logic circuit having a third state output in response to said second state of said seat switch, and
second delay means coupled between said first logic circuit and said second logic circuit to maintain an input to said second logic circuit simulating said second state output of said first logic circuit for a second predetermined time period after said first logic circuit switches from its second state output to its third state output and to provide an input to said second logic circuit simulating said first state output of said first logic circuit after said second predetermined time period when said second logic circuit has its third state output.

21. The system of claim 14 further comprising:
said first logic circuit having a third state output in response to said second state of said seat switch, and
second delay means coupled between said first logic circuit and said second logic circuit to maintain an input to said second logic circuit simulating said second state output of said first logic circuit for a second predetermined time period after said first logic circuit switches from its second state output to its third state output and to provide an input to said second logic circuit simulating said first state output of said first logic circuit after said second predetermined time period when said second logic circuit has its third state output.

22. The system of claim 17 further comprising:
third delay means coupled to said first logic circuit to bias said first logic circuit for a third predetermined time period after said first logic circuit switches from its second state to its third state, said bias being effective to cause said first logic circuit to switch back to its second state when said seat switch switches from its second state to its first state during said third predetermined time period.

23. The system of claim 18 further comprising:
third delay means coupled to said first logic circuit to bias said first logic circuit for a third predetermined time period after said first logic circuit switches from its second state to its third state, said bias being effective to cause said first logic circuit to switch back to its second state when said seat switch switches from its second state to its first state during said third predetermined time period.

24. The system of claim 19 further comprising:
third delay means coupled to said first logic circuit to bias said first logic circuit for a third predetermined time period after said first logic circuit switches from its second state to its third state, said bias being effective to cause said first logic circuit to switch back to its second state when said seat switch switches from its second state to its first state during said third predetermined time period.

25. The system of claim 20 further comprising:
third delay means coupled to said first logic circuit to bias said first logic circuit for a third predetermined time period after said first logic circuit switches from it second state to its third state, said bias being effective to cause said first logic circuit to switch back to its second state when said seat switch switches from its second state to its first state during said third predetermined time period.

26. The system of claim 21 further comprising:
third delay means coupled to said first logic circuit to bias said first logic circuit for a third predetermined time period after said first logic circuit switches from its second state to its third state, said bias being effective to cause said first logic circuit to switch back to its second state when said seat switch switches from its second state to its first state during said third predetermined time period.

27. The system of claim 12 wherein:
said second logic circuit includes a first bi-stable circuit having first and second inputs, and
said first delay is an RC delay circuit having a capacitor and resistor connected in parallel between ground and one of said inputs to said first bi-stable circuit.

28. The system of claim 16 wherein:
said second logic circuit includes a first bi-stable circuit having first and second inputs, and
said first delay is an RC delay circuit having a capacitor and resistor connected in parallel between ground and one of said inputs to said first bi-stable circuit.

29. The system of claim 17 wherein:
said second delay is an RC circuit having a capacitor and resistor connected in parallel between ground and the connection between the output of said first logic circuit and said second logic circuit.

30. The system of claim 27 wherein:
said second delay is an RC circuit having a capacitor and resistor connected in parallel between ground and the connection between the output of said first logic circuit and said second logic circuit.

31. The system of claim 28 wherein:
said second delay is an RC circuit having a capacitor and resistor connected in parallel between ground and the connection between the output of said first logic circuit and said second logic circuit.

32. The system of claim 22 wherein:
said first logic circuit includes a second bi-stable circuit having first and second inputs, and
said third delay is an RC delay circuit having a capacitor and resistor connected in parallel between ground and one of said inputs to said second bi-stable circuit.

33. The system of claim 25 wherein:
said first logic circuit includes a second bi-stable circuit having first and second inputs, and
said third delay is an RC delay circuit having a capacitor and resistor connected in parallel between ground and one of said inputs to said second bi-stable circuit.

34. The system of claim 31 wherein:
said first logic circuit includes a second bi-stable circuit having first and second inputs, and
said third delay is an RC delay circuit having a capacitor and resistor connected in parallel between ground and one of said inputs to said second bi-stable circuit.

35. The safety seat belt improvement of claim 1 further comprising:
warning means responsive to the state of said second logic circuit to provide a warning signal when the start switch is closed in response to said starter disable state.

36. The safety seat belt improvement of claim 12 further comprising:
warning means responsive to the state of said second logic circuit to provide a warning signal in response to said starter disable state.

37. The safety seat belt improvement of claim 17 further comprising:
warning means responsive to the state of said second logic circuit to provide a warning signal in response to said starter disable state.

38. The safety seat belt improvement of claim 22 further comprising:
warning means responsive to the state of said second logic circuit to provide a warning signal in response to said starter disable state.

39. The safety seat belt improvement of claim 34 further comprising:
warning means responsive to the state of said second logic circuit to provide a warning signal in response to said starter disable state.

40. The system of claim 22 wherein:
said third predetermined time period is greater than said second predetermined time period.

41. The system of claim 25 wherein:
said third predetermined time period is greater than said second predetermined time period.

42. The system of claim 31 wherein:
said third predetermined time period is greater than said second predetermined time period.

43. The system of claim 34 wherein:
said third predetermined time period is greater than said second predetermined time period.

* * * * *

UNITED STATES PATENT OFFICE
CERTIFICATE OF CORRECTION

Patent No. 3,757,293     Dated September 4, 1973

Inventor(s) Carl Mogens Petersen, III

It is certified that error appears in the above-identified patent and that said Letters Patent are hereby corrected as shown below:

Column 11, lines 35 and 36 (in claim 1) delete "energized by the closing of the ignition switch and".

Signed and sealed this 20th day of August 1974.

(SEAL)
Attest:

McCOY M. GIBSON, JR.     C. MARSHALL DANN
Attesting Officer        Commissioner of Patents